Patented June 22, 1937

2,084,797

UNITED STATES PATENT OFFICE 2,084,797

METHOD OF PRESERVING GREEN FODDER

Robert G. Ferris, Harvard, Ill., assignor to Starline, Inc., Harvard, Ill., a corporation of Illinois No Drawing. Application March 14, 1935, Serial No. 11,163

3 Claims. (Cl. 99—8)

This invention is a method of preserving green fodder.

The usual hay crops, such as alfalfa, clover, etc., contain more nourishment if mowed while young before valuable nutritive matter has been transformed to cellulose. Certain other plants are highly nourishing when young, but become entirely useless as they mature. It is, therefore, desirable to mow such crops while young and preserve them until needed for use. Furthermore, certain grain crops, like oats, can often be mowed once for young green fodder and still mature a full grain crop, and this is desirable if the young and green material can be preserved. Making hay of this very young green material by ordinary sun drying is generally impractical and is somewhat destructive of the nutritive value.

Various efforts have been made to preserve fodder of this young, green and succulent character, but the methods so far suggested are objectionable either by reason of the high cost of equipment or of inconvenience and expense in operation. By the present process, complete preservation may be accomplished with simple equipment and at very low cost.

The process employs a gaseous preservative markedly heavier than air, the preferred agent being sulfur dioxide. The method may conveniently be carried out in an ordinary silo provided with the usual doors located at different levels in a vertical line. It is a common practice in filling silos to close two or three doors above the level of the accumulated silage and to close additional doors as the level rises. In practicing the present method, sulfur dioxide is generated by burning sulfur in any suitable receptacle hung from and preferably sufficiently below the lowest of the open doorways to be screened from wind. The receptacle will thus be several feet at least above the bottom of the silo at the start and above the fodder level as the silo is filled. The hot gas from the burning sulfur rises a short distance but quickly cools and descends by gravity, displacing most of the air from the bottom of the silo. The level to which the silo is filled with a body of gas sufficiently dense to be an effective preservative is readily visible under normal conditions because the moisture of the air unites with some of the gas, forming a visible cloud with a fairly definite upper surface.

In the first instance, the sulfur is burned until the cloud fills several feet at the bottom of the silo and the filling of the silo with the fodder chopped in short lengths is commenced. Fodder is supplied by the usual silo filler and showers in from the top, falling through the preservative gas in separated, somewhat damp pieces. The fodder thus falling through and lodging in the gas body absorbs enough gas to be effectively preserved.

As the silo is filled, which may take days or weeks or which may go on through an entire mowing season, the doors are closed to higher and higher levels and additional sulfur is burned so that at all times while filling is going on, the gas level is maintained several feet above the surface upon which the falling fodder comes to rest.

By this very simple method, the fresh, green and damp fodder may be thoroughly preserved against undesirable fermentation or putrification until needed for use.

What I claim as new, and desire to secure by Letters Patent, is:

1. The method of preserving green fodder, consisting in generating sulfur dioxide by burning sulfur at a point above the bottom of a receptacle, permitting the sulfur dioxide to settle by gravity to the bottom of the receptacle, continuing the generation until the apparent gas level is several feet above the bottom of the receptacle, showering the fodder into the receptacle and permitting it to fall through the gas layer to the bottom of the receptacle, and generating additional sulfur dioxide from time to time at points above the rising level of the fodder to maintain the apparent gas level during filling several feet above the fodder level.

2. The method of preserving green fodder, consisting in filling the bottom of a storage receptacle largely with sulfur dioxide, showering the fodder into the receptacle, permitting it to fall through the sulfur dioxide to the bottom of the receptacle and adding sulfur dioxide from time to time to maintain a considerable layer thereof above the level of the fodder while the same is being added.

3. The method of treating green fodder with a gaseous preservative heavier than air, consisting in filling the bottom of a storage receptacle largely with the preservative gas, showering the fodder through the layer of gas to the bottom of the receptacle and supplying additional gas from time to time to maintain a level thereof substantially above that of the accumulated fodder while the latter is being added to the receptacle.

ROBERT G. FERRIS.